United States Patent [19]

Melander

[11] 4,160,153
[45] Jul. 3, 1979

[54] DUTY CYCLE SHARED PROPORTIONAL TEMPERATURE CONTROL

[75] Inventor: Theodore A. Melander, Minneapolis, Minn.

[73] Assignee: Pako Corporation, Minneapolis, Minn.

[21] Appl. No.: 809,844

[22] Filed: Jun. 24, 1977

[51] Int. Cl.² .......................... H02M 7/00; H02J 3/00
[52] U.S. Cl. .................................... 219/485; 219/483; 219/486; 219/492; 219/508; 307/39
[58] Field of Search ............... 219/485, 490, 486, 483, 219/508; 307/38, 39, 40, 41

[56] References Cited

U.S. PATENT DOCUMENTS

| 3,153,728 | 10/1964 | Procter | 307/39 X |
|---|---|---|---|
| 3,243,597 | 3/1966 | Burley | 307/39 |
| 3,296,452 | 1/1967 | Williams | 307/39 |
| 3,519,786 | 7/1970 | Roberts | 219/98 |
| 3,586,869 | 6/1971 | Kompelien | 219/486 |
| 3,858,094 | 12/1974 | Hanchett, Jr. | 307/38 |
| 3,872,371 | 3/1975 | Williams | 307/38 X |
| 3,901,308 | 8/1975 | Berger | 307/39 |
| 4,020,358 | 4/1977 | Wyland | 307/39 |
| 4,048,812 | 9/1977 | Thomason | 307/39 X |
| 4,063,075 | 12/1977 | Collom | 219/108 |

FOREIGN PATENT DOCUMENTS 1455014  11/1976  United Kingdom ...................... 307/38

*Primary Examiner*—C. L. Albritton
*Assistant Examiner*—M. Paschell
*Attorney, Agent, or Firm*—Kinney, Lange, Westman and Fairbairn

[57] ABSTRACT

A system having two heaters, such as a photographic processor with a solution heater and a dryer heater, has proportional controllers for each of the heaters. A priority control co-ordinates operation of the two controllers to give full priority to one of the two heaters during warm up, and a reduced percentage for running conditions. The other heater is allowed to share the remaining available input power.

14 Claims, 3 Drawing Figures

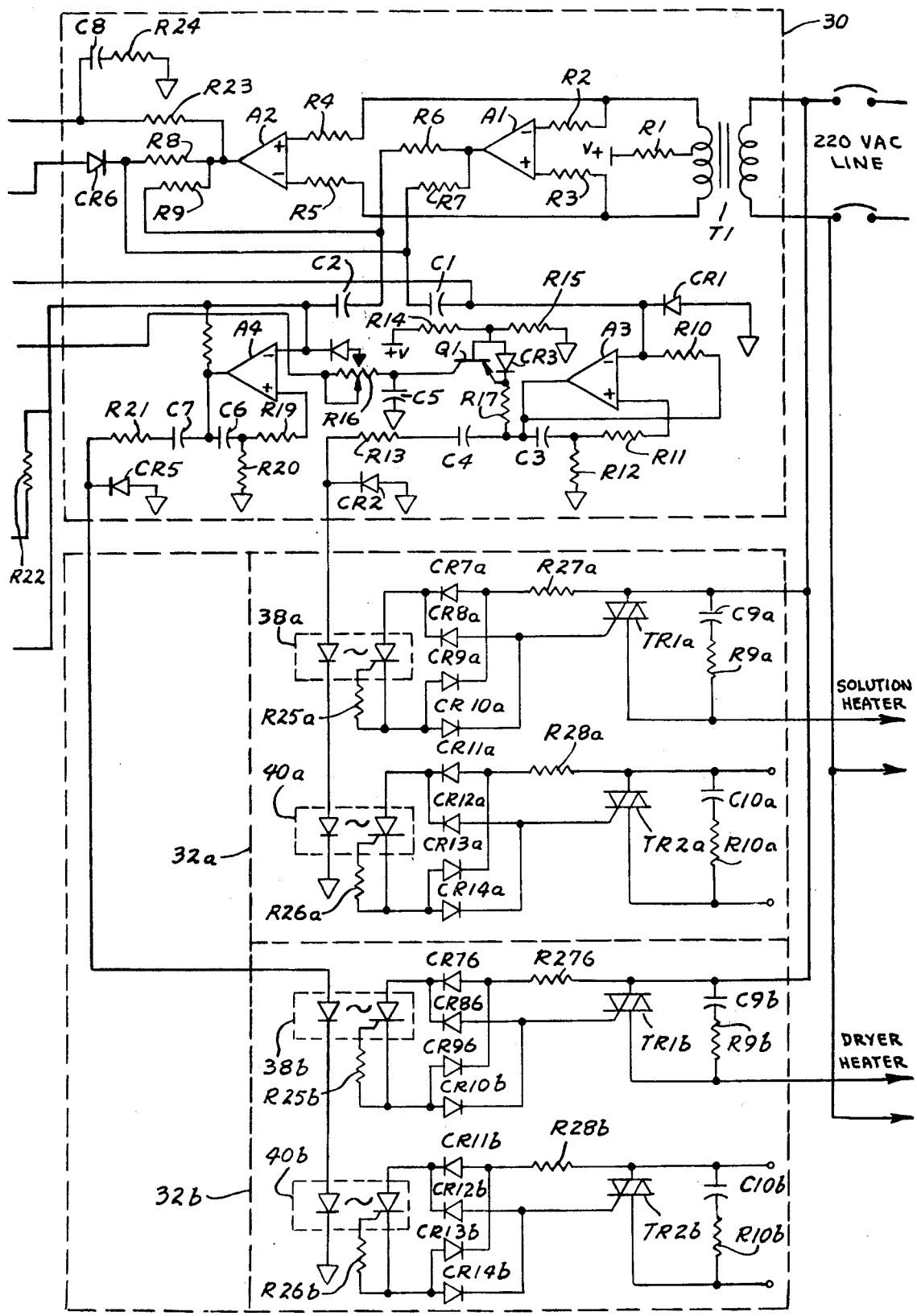

DUTY CYCLE SHARED PROPORTIONAL TEMPERATURE CONTROL

REFERENCE TO CO-PENDING APPLICATION

Reference is made to a co-pending application Ser. No. 809,845 by R. Engelmann entitled "Dual Priority Temperature Control", filed on even date with this application, now U.S. Pat. No. 4,138,607 and assigned to the same assignee as this application.

BACKGROUND OF THE INVENTION

The present invention relates to control systems for use in systems which supply power to more than one load. In particular, the present invention is a control system which provides programmed priority to one of the loads and allows the other load to use the remaining available power.

There are many systems in which power is supplied to more than one high power consuming load. One example of such a system is a photographic processor, which includes solution tanks for developing photographic film or paper and a dryer for drying the film or paper. Heaters are required to heat the solution used in the solution tanks and to heat air used in the dryer.

An additional requirement of the photographic processor is that the developer solution and the drying air must be heated rather rapidly. This causes the solution heater and dryer heater to have very high peak power demands (the developer during initial warm up and the dryer when processing). The power required to maintain the solution at the desired temperature once that temperature has been initially attained is much less than the power required for fast heat up. For example, the power required to maintain solution temperature is typically less than 50% of the peak power required for fast heat up.

The separate high peak power demands of the solution and dryer heaters create several significant problems. First, the high demand is expensive to the owner/operator of the processor. Second, the high demand may require special electrical wiring or special electrical service in order to provide the necessary power. This is an additional expense and complication which should be avoided if possible.

SUMMARY OF THE INVENTION

The present invention is a control system for use in systems requiring that power be supplied to at least two loads. First and second sensors sense parameters associated with operations of the first and second loads. First and second controllers control the power supplied to the first and second loads in accordance with signals from the first and second sensors. The operation of the first and second controllers is coordinated by priority means, which allows the first and second loads to share the available input power, but gives priority to the first load during initial warm up and limited priority thereafter.

DETAILED DESCRIPTION OF THE PREFERRED EMBODIMENTS

Figure 1:
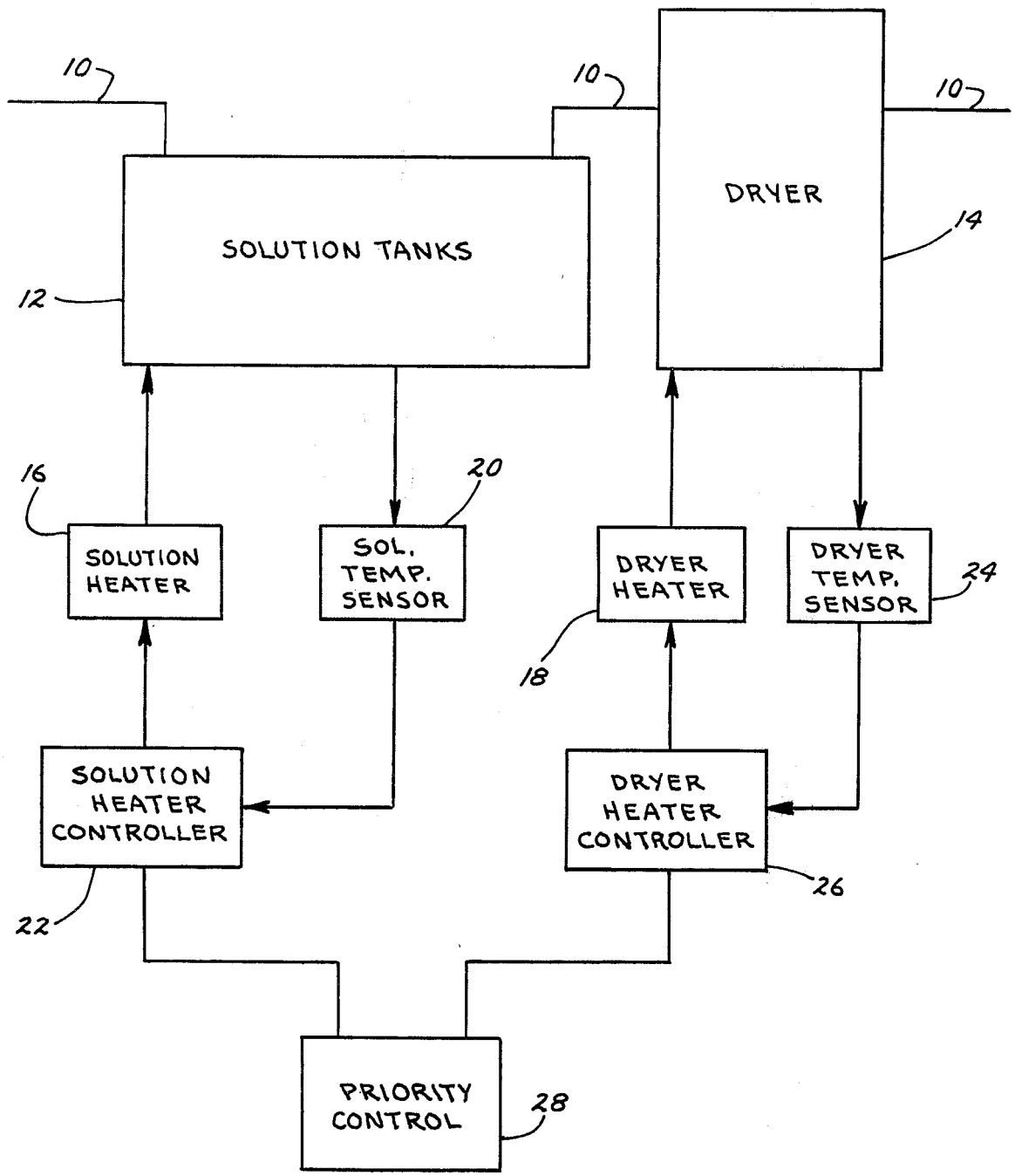
FIG. 1 is a block diagram of a photographic processor utilizing the improved control system in the present invention.
Figure 2A:
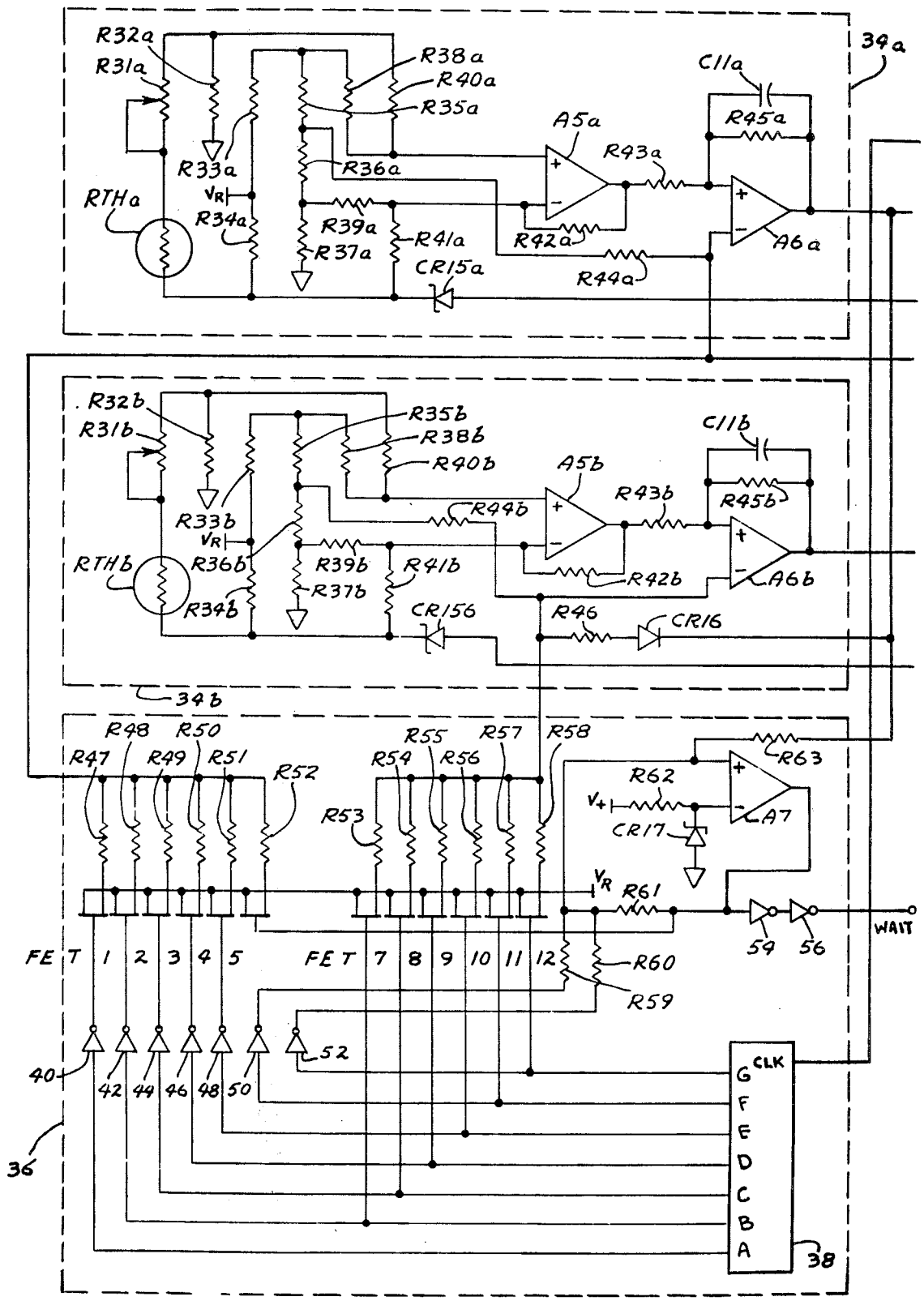

FIG. 1 shows a photographic processor utilizing the present invention. Photosensitive material 10, which may be photographic film or paper, is transported through solution tanks 12 and then through dryer 14. The photosensitive material 10 is developed in solution tanks 12 and dried in dryer 14.

For proper operation of the photographic processor, solution in solution tanks 12 and drying air in dryer 14 must be maintained at an elevated temperature. Solution heater (or heaters) 16 supplies the necessary heat to the solution in solution tanks 12 while dryer heater (or heaters) 18 supplies the necessary heat to the drying air used in dryer 14.

In order to maintain the solution in solution tanks 12 at the desired temperature level, solution temperature sensor 20 senses the temperature of the solution. Signals from solution temperature sensor 20 are provided to solution heater controller 22, which controls the energy supplied to solution heater 16. In a preferred embodiment of the present invention, solution heater controller 22 has a proportional control band.

Similar control of temperature within dryer 14 is provided. Dryer temperature sensor 24 senses the temperature of the air within the dryer 14 and provides signals to dryer heater controller 26. Energy supplied to dryer heater 18 is controlled by dryer heater controller 26. In preferred embodiments of the present invention, dryer heater controller 26 is, like solution heater controller 22, a time proportioning controller having a proportional control band.

The control system of the present invention also includes a priority control 28 which controls and coordinates the operation of solution heater controller 22 and dryer heater controller 26. In the preferred embodiments of the present invention, priority control 28 inhibits the dryer heater controller 26 from providing input power to dryer heater 18 when solution heater controller 22 is providing power to solution heater 16 and allows the dryer heater 18 to share the remaining available input power.

The present invention, as shown in FIG. 1, is based upon the recognition that photographic processing is characterized by relatively low heat (energy) demands for the maintenance of processing solution temperatures, and relatively high energy (heat) demands for the drying of the processed material. Because the dryer air has low thermal inertia and the solutions have high thermal inertia, the energy demands to bring the photographic processing system to operating temperature (i.e. warming up) are just the opposite of the energy demands during actual processing of film or paper. Duty cycles for solution heaters are high during warm up and low when the processor is processing. Duty cycles for dryer heaters are low during warm up and high when the processor is processing.

If rapid warm up and adequate drying capabilities are accomplished with conventional control systems, high peak power is demanded when solution and dryer heaters are both on. The control system of the present invention eliminates these high peak demands. Two time proportioning controls (i.e. controllers 22 and 26) share the same time base. Heaters 16 and 18 ae controlled so they cannot be on simultaneously. Priority control 28 gives priority to solution heater 16 with the dryer heater 18 being allowed to use only that portion not demanded by solution heater 16. During initial warm up, solution heater 16 will be 100% on. When the solution temperature approaches the set point temperature and solution heater controller 22 enters the proportional band, the duty cycle of solution heater 16 becomes less than 100% making the remainder available for dryer heater 18.

In a preferred embodiment of the present invention, priority control 28 limits the percentage of each duty cycle solution heater 16 may use once the initial warm up of the solution has been completed and steady state processing operation has begun. For example, the solution may be given absolute priority to input power during warm up and a reduced percentage (for example 25%) once its duty cycle has decreased to less than that percentage. This assures dryer heater 18 of at least 75% of the available input power once the initial warm up of the solution has been completed.

The following example illustrates how heater sizes are chosen and how the present invention yields a significant reduction in peak energy demand without any sacrifice in the operation of the processor. Warm up requirements for solution heating are 2000 watts, while processing requirements for solution heating are less than 500 watts. Dryer processing requirements are 1500 watts. Conventional design used in the prior art would then require 2000 watts for solution heater 16 and 1500 watts for dryer heater 18, netting a peak demand of 3500 watts. The present invention utilizes 2000 watts or solution heater 16. Since less than 500 watts are needed during processing, the duty cycle after warm up is a maximum of 25%. Priority control 28 latches solution heater controller 22 to allow a maximum 25% duty cycle on solution heater 16 after initial warm up. The remaining 75% of the duty cycle must provide 1500 watts of dryer heat. A 2000 watt dryer heater 18 is provided, since 75% of 2000 watts yields 1500 watts.

Since only 2000 watts can be on at one time, the peak demand is reduced from 3500 to 2000 watts. The peak demand of the present invention, therefore, is only 57% of the prior art design.

The system of the present invention may be implemented with a variety of different circuits. For example, in the previously mentioned co-pending application Ser. No. 809,845 by R. Engelmann entitled "Dual Priority Temperature Control", now U.S. Pat. No. 4,138,607 two different control circuits are shown, each of which performs the functions of solution temperature sensor 20, solution heater controller 22, dryer temperature sensor 24, dryer heater controller 26, and priority control 28.

In conclusion, the present invention allows significant power saving since it takes advantage of the fact that the high peak energy demands of the solution heater and the dryer heater are separate and not simultaneous. By giving the solution heater priority during initial warm up and thereafter allowing the dryer heater to share in the remaining available input power, substantial savings are achieved.

Although the present invention has been described with reference to preferred embodiments, workers skilled in the art will recognize that changes may be made in form and detail without departing from the spirit and scope of the invention.

What is claimed is:

1. In a processor of photosensitive material having a solution heater and a dryer heater, a control system comprising:

solution heater control means for controlling input power provided to the solution heater;

dryer heater control means for controlling input power provided to the dryer heater; and priority means for coordinating the operation of the solution heater control means and the dryer heater control means to give the solution heater priority to input power until power demand of the solution heater control means decreases to a predetermined level and then permitting the solution heater control means and the dryer heater control means to share input power.

2. The control system of claim 1 wherein the priority means allows the dryer heater to use all input power not used by the solution heater during each operating cycle after power demand of the solution heater control means decreases to the predetermined level.

3. The control system of claim 1 wherein the solution heater control means comprises:

solution temperature sensor means for sensing solution temperature and providing a solution temperature signal; and a solution heater controller for controlling input power provided to the solution heater in response to the solution temperature signal.

4. The control system of claim 3 wherein the dryer heater control means comprises:

dryer temperature sensor means for sensing dryer air temperature and providing a dryer temperature signal; and a dryer heater controller for controlling input power provided to the dryer heater in response to the dryer temperature signal.

5. The control system of claim 4 wherein the solution heater controller and the dryer heater controller are time proportioning controllers sharing a common time base.

6. In a system for supplying power to first and second loads, a control system comprising:

first and second sensor means for sensing parameters associated with operation of the first and second loads, respectively;

first and second controller means for controlling the first and second loads by controlling as a function of signals from the first and second sensor means, first and second time intervals during each operating cycle that input power is supplied to the first and second loads, respectively; and priority means for coordinating operation of the first and second controller means to give priority to the first load and the first controller means and to inhibit the second controller means from commencing the second time interval until the first time interval is completed.

7. The control system of claim 6 wherein the priority means limits the first time interval to a predetermined percentage of each operating cycle after the first time interval has decreased to the predetermined percentage during any preceding operating cycle.

8. The control system of claim 6 wherein the first and second loads are heaters and the first and second sensor means are temperature sensors.

9. The control system of claim 8 wherein the first load is a solution heater for a photographic processor and wherein the second load is a dryer heater for a photographic processor.

10. The control system of claim 6 wherein the first and second controller means have proportional control bands.

11. A control system for controlling operation of first and second loads, the control system comprising:
first sensor means for sensing a parameter associated with operation of the first load;
second sensor means for sensing a parameter associated with operation of the second load;
first controller means for controlling the first load by controlling, as a function of signals from the first sensor means, a first time interval during each operating cycle that input power is supplied to the first load;
second controller means for controlling the second load by controlling, as a function of signals from the second sensor means, a second time interval during each operating cycle that input power is supplied to the second load; and
priority means for inhibiting the second controller means from commencing the second time interval in any operating cycle until the first interval is completed.

12. The control system of claim 11 wherein the first and second loads are heaters and the first and second sensor means are temperature sensors.

13. The control system of claim 12 wherein the first load is a solution heater for a photographic processor and wherein the second load is a dryer heater for a photographic processor.

14. In a processor of photosensitive material having a solution heater and a dryer heater, a control system comprising:
solution heater control means controlling, on a time proportioning basis, input power provided to the solution heater;
dryer heater control means for controlling, on a time proportioning basis, input power provided to the dryer heater; and
priority means for coordinating operation of the solution heater control means and the dryer heater control mens to prevent the solution heater and the dryer heater from simultaneously receiving input power, to give the solution heater priority to input power during initial warm up of the solution heater, and to allow the dryer heater to share input power on a duty cycle sharing basis after initial warm up of the solution heater.

* * * * *